United States Patent [19]

Hawerkamp

[11] Patent Number: 5,018,555
[45] Date of Patent: May 28, 1991

[54] PRE-PRESS TUBE

[76] Inventor: Manfred Hawerkamp, Altenrather Strasse 5, 5210 Troisdorf, Fed. Rep. of Germany

[21] Appl. No.: 221,296

[22] Filed: Jul. 19, 1988

[30] Foreign Application Priority Data

Jul. 25, 1987 [DE] Fed. Rep. of Germany ....... 3724767

[51] Int. Cl.⁵ ............................................ F16L 47/00
[52] U.S. Cl. .................................... 138/155; 138/109; 285/332.4; 285/333; 285/286; 285/423; 285/921
[58] Field of Search ............... 138/109, 177, 178, 155, 138/120; 285/333, 334, 286, 328, 332.1, 332, 423, 919, 913, 260, 921, 332.4

[56] References Cited

U.S. PATENT DOCUMENTS

| | | | |
|---|---|---|---|
| 2,051,499 | 8/1936 | Siegle | 285/333 |
| 2,056,112 | 9/1936 | Protin | 285/333 |
| 2,772,899 | 12/1956 | Evans | 285/333 |
| 3,079,181 | 2/1963 | van der Wissel | 285/333 |
| 4,154,466 | 5/1979 | Simmons | 285/334 |
| 4,298,221 | 11/1981 | McGugan | 285/921 |
| 4,760,889 | 8/1988 | Dudman | 138/155 |
| 4,779,902 | 10/1988 | Lee | 285/423 |

FOREIGN PATENT DOCUMENTS 908930 10/1962 United Kingdom ............... 285/921

Primary Examiner—James E. Bryant, III
Attorney, Agent, or Firm—McGlew & Tuttle, P.C.

[57] ABSTRACT

A pre-press tube is composed of several lengths of tube with a plug-in end at one end and a plug-in socket at the other opposite end. Plug-in end and plug-in socket are chosen to be conical in such a way, that when the plug-in end is pressed into the plug-in socket, not only a form - and force locking arrangement is obtained, but even a tight connection of the material by means of a lattice like polymerization of the contact surfaces is obtained. As a result a tight, solid connection of tubes with a smooth surface is achieved.

1 Claim, 1 Drawing Sheet

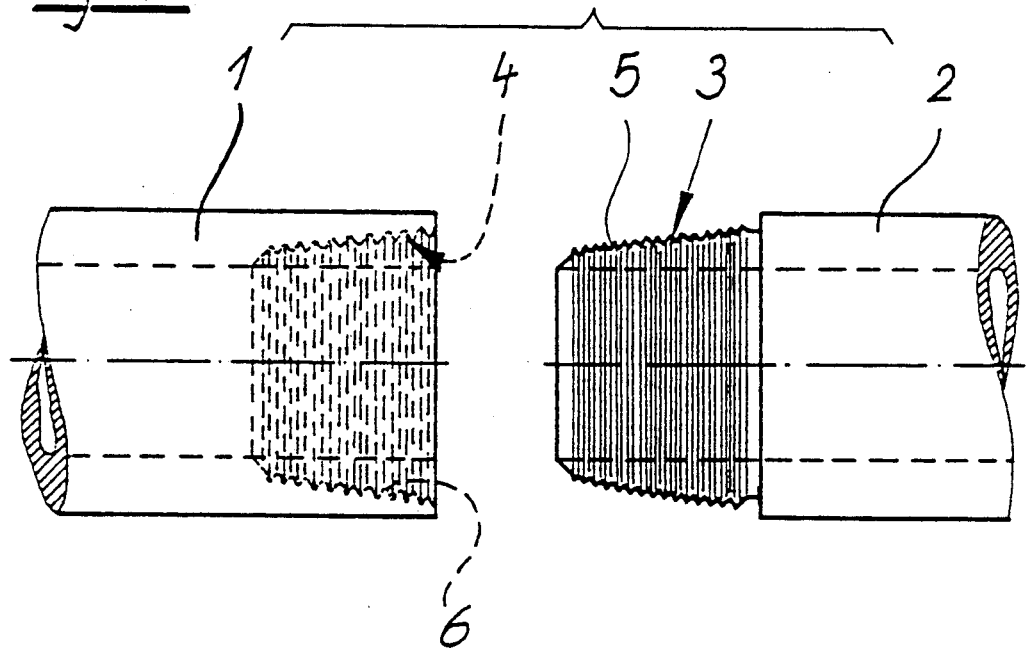
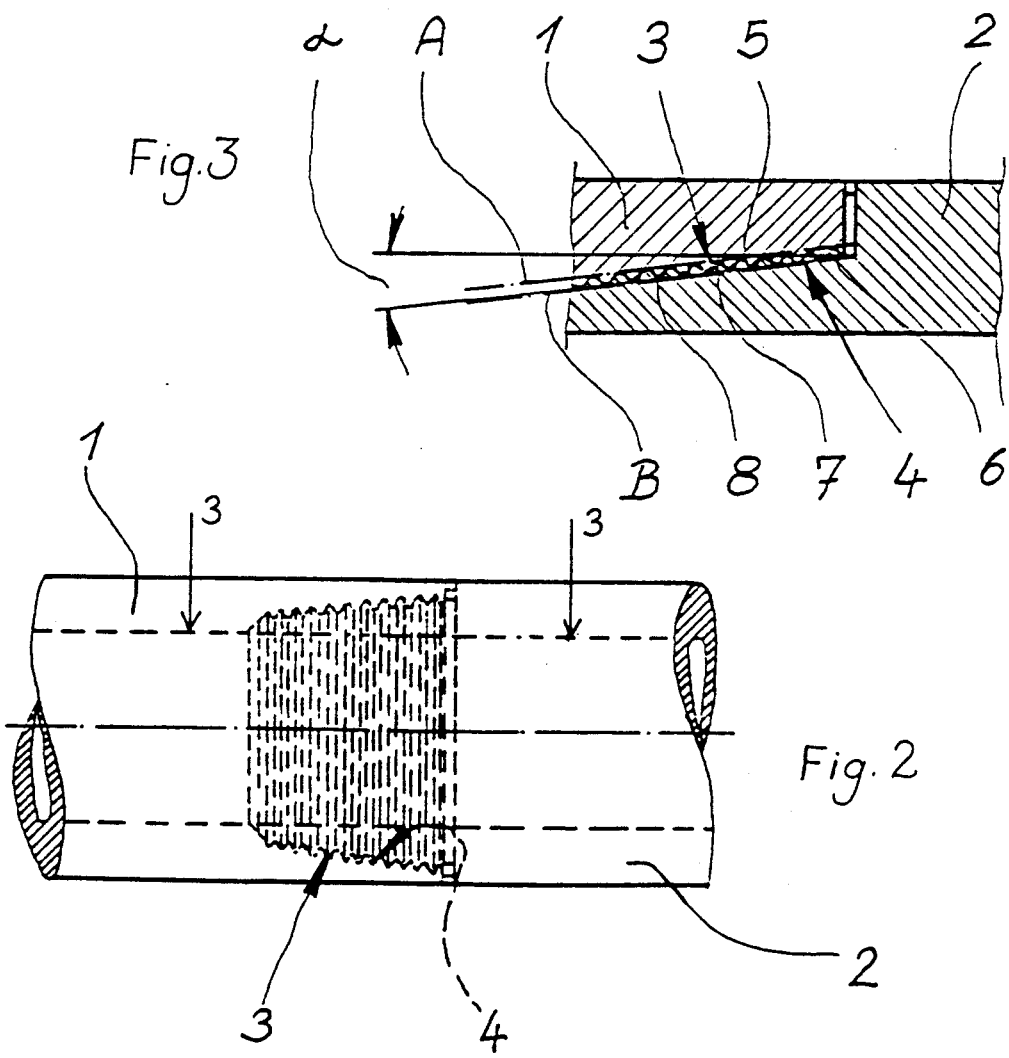

PRE-PRESS TUBE

BACKGROUND OF THE INVENTION

1. Field of the Invention

The invention relates in general to tubes and in particular to a new and useful tube, especially a pre-pressed tube, composed of a plurality of lengths of tube made up of a thermoplastic synthetic material, each length of tube having at one end a plug-in socket, which is conical to the inside for receiving a plug-in end of the length of tube to be connected.

Tubes or pipe line conduits and especially pre-pressed tubes have a permanent problem in respect to producing a smooth, dense and solid connection of the tubes between the individual lengths of tubes. In general the length of tubes made up of synthetic materials are welded in each other on the building site or in a tube-ditch. However, welding is not possible with pre-press tubes advanced inside of the soil. In both cases a traditional welding of the lengths of tubes is very time-consuming and expensive.

SUMMARY OF THE INVENTION

The invention provides a tube, especially a pre-pressed tube which has a smooth surface for the connection of the lengths of tubes with an optimal consistency, stability, and homogeneity, and which is easy to be mounted or embedded.

The invention includes a tube, especially a pre-pressed tube with an outer cone of the plug-in end and an inner cone of a plug-in socket each providing corresponding in-formings and out-formings. The tube includes a plug-in end, brought into a plug-in socket having in-forming and out-formings of outer and the inner cones engaged into each other and forming a force-locking connection, which is positively locked. Pursuant to a preferred embodiment of the invention it is provided, that the in- and out-formings of the outer- and the inner cone are fashioned as wave crests and -troughs, which rotate around the plug-in end and the plug-in socket in the direction of the circumference. The outer cone, which is fashioned by the top-line of the plug-in end which is bigger than the inner cone of the plug-in socket, is formed by the top line intersecting the wave peaks of the cone. This measure of the invention has the consequence, that the in- and out-formings, or the wave crests-and troughs are pressed into each other homogeneously during the process of bringing the plug-in end into the plug-in socket, and that is preferably in the middle area of the tube connection. Thus a mechanical force-locking is established, and a positive locking is obtained, so that in the entire cross-section of the tube a transmission of power is guaranteed.

In addition, a balance of tolerance in the areas of the diameters of the plug-in end and the plug-in socket is obtained in the course of the production of the connection of the tubes, that deviations of the norm, deriving from the manufacturing process do not disturb in the production of the inner and the outer cone of the plug-in socket, as long as they range within the given area of tolerance. The in- or out-formings or the wave-shaped fashioning of the outer cone and the inner cone practically form detent or stop profiles, or these tube parts are plugged into each other by a connection of detents, the more so as the toplines of the wave crests provide diameters, which overlap each other.

Pursuant to a preferred embodiment of the invention, which has an individual importance, it is provided, that the angle of inclination, which is given by means of the conicity of the outer and the inner cone, is chosen to be in the area of the slide friction angle or a little below the automatic locking, and is established, when the plug-in socket is pressed into the plug-in end, and thus a tight connection of the material is obtained. This tight connection means that a lattice-like polymerization or network is achieved between the outer surface of the plug-in end at the acting surfaces. Choosing this slide friction angle in the close area of the angle of friction of rest, but below it, such a high pressure or friction, or pressure of surface at the wave crests of the outer and the inner cone is reached. This is when the plug-in end and the plug-in socket of the lengths of tubes to be connected to each other are slid into each other. At the surface of the out-formings and at the wave crests, surprisingly a welding temperature is reached. Through this heat development and the high specific pressures in addition to the form -and force-locking connection a welding connection is obtained between the plug-in end and the plug-in socket, and thus there is a tight connection of material.

These effects occur virtually automatically when the inventive tube is used as a pre-pressed-tube, meaning when it is used for a canal-type-pre-pressed market. The tight connection of the material, which exceeds the form -and force-locking practically provides a sealing of the connection of the tubes. In this way the construction not only provide a smooth surface and a solid wall, but displays an optimal density and sealing as well. From the point of view of the technique of embedding, it is very important that the traditional welding process is not necessary any more, and that the welding is carried out in the course of the embedding of the tubes or in the course of the connecting process of the tubes.

Accordingly, it is an object of the invention to provide a plurality of interconnectable pipe lengths, each of which has an axially inwardly tapered end at one end and an opposite end with an axially outwardly tapered end, and with annular formations on the inwardly tapered end which are engageable over inwardly extending formations on the inwardly tapered end and are pressure engageable to form a tight interconnection.

A further object of the invention is to provide a method of forming an assembly of interconnected tube lengths which comprises forming each length with one end having an inwardly and axially tapered exterior portion, and an opposite end with an outwardly extending tapered interior portion with substantially annular inter-engageable alternate circumferentially projecting elements and recess portions arranged axially along their lengths and which further comprises fitting the inwardly tapered interior portion into the outwardly tapered exterior portion while subjecting the portions to axial inter-engagement pressure so as to force inter-engagements of said projecting and recess portions.

A further object of the invention is to provide a pipe made up of individual pipe lengths which have inter-engageable inwardly tapered and outwardly tapered end portions formed with projections which engage behind each other and interlock, which are simple in design, rugged in construction, and economical to manufacture.

The various features of novelty which characterize the invention are pointed out with particularity in the claims annexed to and forming a part of this disclosure.

For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 1, is an exploded side elevational view of two lengths of an inventive tube assembly before the connection of the tubes is carried out;

FIG. 2, is a side elevational view of the interconnected tube pursuant to FIG. 1 after the connection of the tubes is carried out with the interconnected portions being shown in dotted lines; and, FIG. 3, is an enlarged partial axial sectional view of the interconnected tubes taken along the line 3—3 of FIG. 2.

DESCRIPTION OF THE PREFERRED EMBODIMENT

In accordance with the invention an assembly of interconnected tube lengths 1 and 2 is effected by forming each length with one end with an inwardly axially tapered exterior portion 3, and an opposite end with an outwardly extending tapered interior portion 4, with substantially annular interengageable alternate circumferential in formings or wave recesses 7 and out-formings or wave projections 8. In accordance with the invention the tube lengths 2 and 3 are tightly fitted together by engaging the inwardly tapered interior portion 3 with the outwardly tapered exterior portion 4, while subjecting the portions to axial interengagement pressure so as to force interengagement of said projecting and recess portion 7 and 8 with each other.

In the figures a tube, especially a pre-pressed tube, is made up of two or several lengths of tubes 1 and 2 each made of thermoplastic synthetic material as for example a polyethylene material. Each length of tube 1 and 2 provides, at their one ends, an outer-coneshaped inwardly beveled plug-in-end 3, and at the other end an inner-cone-plug-in end or outwardly beveled socket 4. The beveled socket receive the plug-in-end 3 of a length of tube to be connected. An outer or exterior inwardly beveled cone 5 of the plug-in-end 3 and the inner of interior outwardly beveled cone 6 of the plug-in-socket 4 provide, respectively, corresponding interengageable in-formings 7 and out-formings 8. At the plug-in-end 3, brought into the plug-in-socket 4 the outer cone 5 and the inner cone 6 engage alternatingly into each other and form a form-and force locking connection. The in-and out-formings of the exterior cone 5 and the interior cone 6 are fashioned as annular interconnectible portions in the form of wave-crests 7 and wave troughs 6, which extend around the circumferences thereof.

The outer cone 5 of the plug-in end 3, fashioned by the top line A (the line intersecting the tops or wave crests of the cones) is bigger than the inner cone 6 of the plug-in socket 4, fashioned by the top line B, so that the wave crests 7 of the outer cone 5 and the inner cone 6 overlap each other, and first a detent or stop connection is established. The angle of bevel inclination designated $\alpha$ (alpha) is set by the conicity of the outer cone 5 and the inner cone 6 is chosen, substantially equal to the slide friction angle, so that it is a little below the rest friction angle and thus a little below the level the automatic locking. This has as the consequence that when the plug-in-end 3 is pressed into the plug-in socket 4, there is a tight connection of the material in the area of the contact surfaces. This comprises a lattice-like polymerization of the wave crests 7 as a result of a welding by a high pressing pressure which causes a welding connection. The result is a solid homogenous connection between the plug-in end 3 and the plug-in socket 4, meaning a sealing which exceeds a form-and force locking connection, that is in the case of a pre-pressed tube the sealing occurs automatically in the course of the pre-pressed movement.

While specific embodiments of the invention have been shown and described in detail to illustrate the application of the principals of the invention, it will be understood that the invention may be embodied otherwise without departing from such principals.

What is claimed is:

1. A tube structure, comprising: at least two lengths of tube formed of thermoplastic synthetic material, each tube having one end with a plug-in portion, said plug-in portion being conically and inwardly tapered to from an outer cone and each tube having an opposite other end with a plug-in interior socket, said plug-in interior socket being conically outwardly tapered on an interior portion to form an inner cone for receiving a plug-in portion of a length of tube to be connected, said outer cone of said plug-in-end and said inner cone of said plug-in interior socket each including annular informings and annular outformings, said informings and said outformings of each of said outer cone and said inner cone are formed as wave troughs and wave crests respectively, a top line passing through wave crests of said outer cone defining an outer cone size, a top line passing through wave crests of said inner cone defining an inner cone size, said outer cone size being larger than said inner cone size, said top line of each of said inner cone and said outer cone each forming an angle of inclination with respect to a central axis of the tube, said angle of inclination being chosen to be substantially equal to a sliding friction angle, said informings and outformings of each of said outer cone and said inner cone engaging each other alternatingly in a force-locking connection to form a positive locking connection wherein the annular informing and annular outforming are substantially welded together.

* * * * *